May 29, 1973  J. F. TOURTELLOTTE ET AL  3,736,105
CATALYTIC MUFFLER
Filed Oct. 6, 1971  4 Sheets-Sheet 1

JOHN F. TOURTELLOTTE
JOHN F. VILLIERS-FISHER
JOHN S. NEGRA
INVENTORS

BY *J. J. Chabot*
AGENT

JOHN F. TOURTELLOTTE
JOHN F. VILLIERS-FISHER
JOHN S. NEGRA
INVENTORS

May 29, 1973   J. F. TOURTELLOTTE ET AL   3,736,105
CATALYTIC MUFFLER
Filed Oct. 6, 1971   4 Sheets-Sheet 4
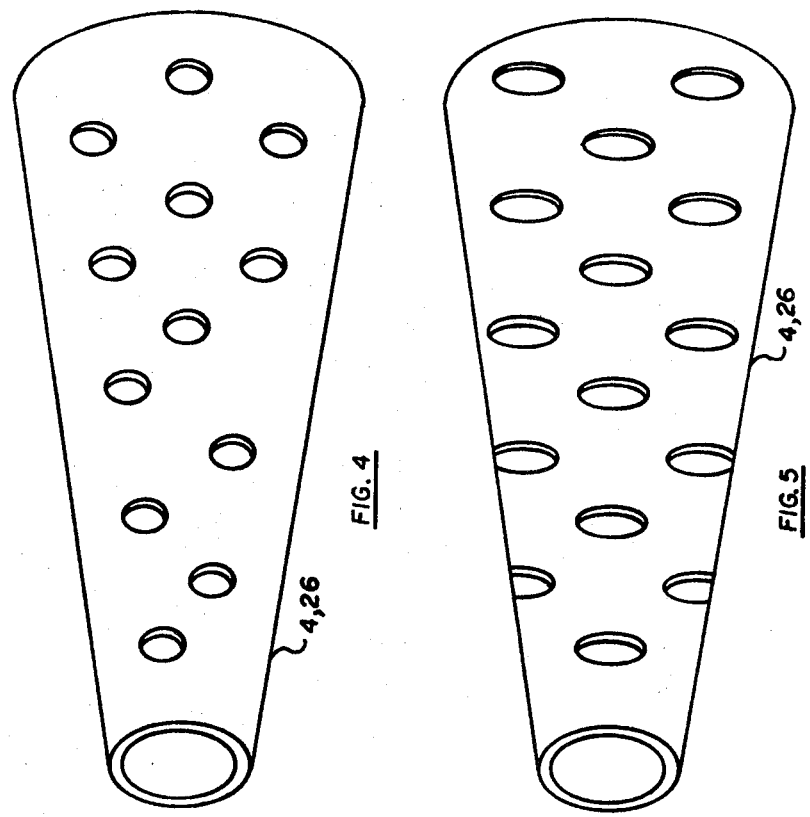
JOHN F. TOURTELLOTTE
JOHN F. VILLIERS-FISHER
JOHN S. NEGRA
INVENTORS
AGENT

United States Patent Office 3,736,105
Patented May 29, 1973

---

3,736,105
CATALYTIC MUFFLER
John F. Tourtellotte, 634 Glen Ave., Westfield, N.J.
07090; John F. Villiers-Fisher, 2 Newman Drive, Kendall Park, N.J. 08824; and John S. Negra, 295 S.
Plainfield Ave., Plainfield, N.J. 07080
Filed Oct. 6, 1971, Ser. No. 186,859
Int. Cl. B01j 9/04; F01n 3/14
U.S. Cl. 23—288 F 4 Claims

ABSTRACT OF THE DISCLOSURE

An apparatus for catalytically treating the exhaust gas from an engine, so as to eliminate noxious components and prevent air pollution. The apparatus features a tapered exhaust gas inlet pipe, which provides uniform distribution of exhaust gas to a cylindrical catalyst bed.

BACKGROUND OF THE INVENTION

Figure 1:
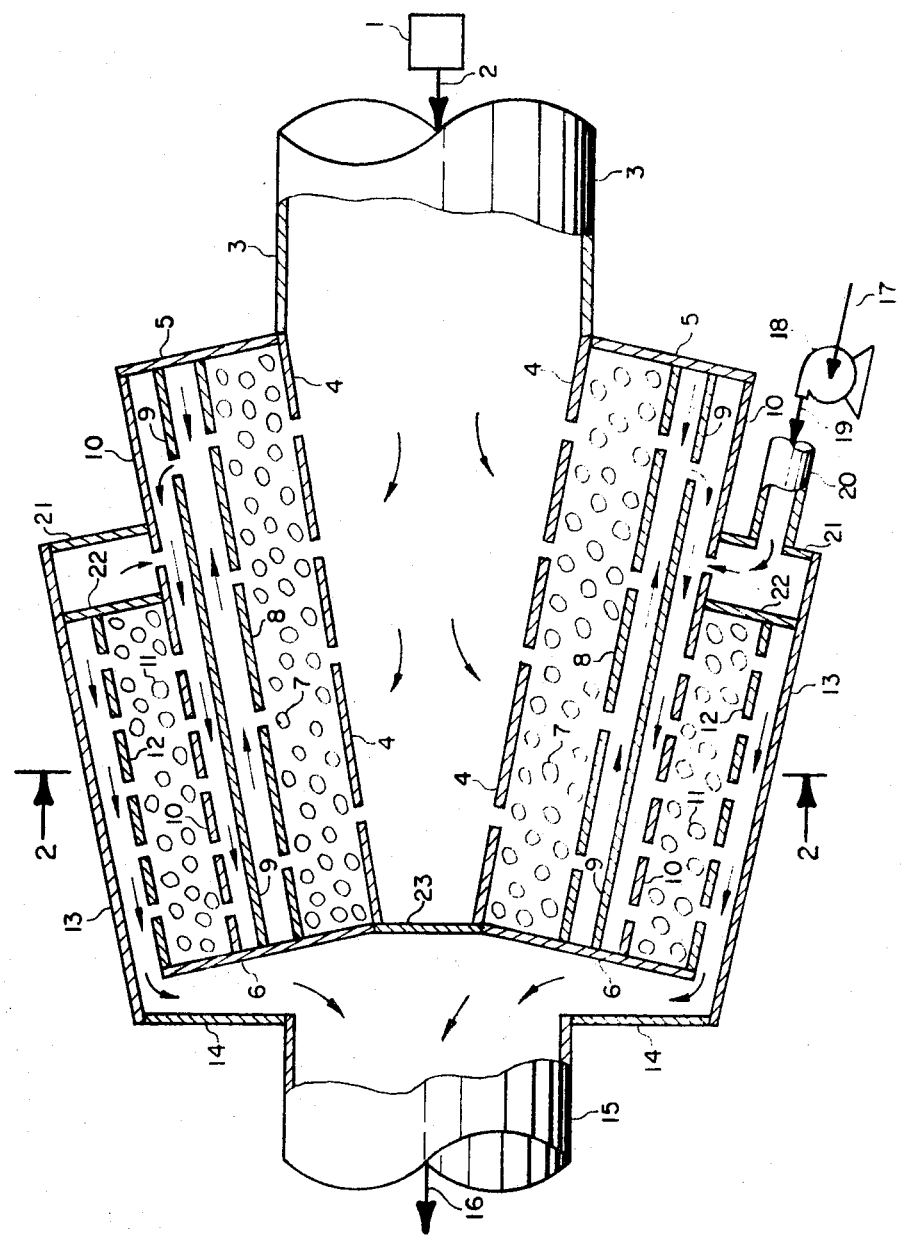

Field of the invention.—The invention relates to the prevention of air pollution due to the emission of unburned or thermally degraded hydrocarbons, carbon monoxide and nitrogen oxides in the exhaust gas of engines, such as internal combustion engines as provided for vehicles such as automobiles, trucks, buses, tractors and motorcycles, or the like. In recent years it has been recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas after initial catalytic reduction of nitrogen oxides, followed by catalytic oxidation of residual hydrocarbons, carbon monoxide, etc., in various types of apparatus or catalytic mufflers especially designed for this purpose.

The invention relates particularly to catalytic exhaust gas treatment apparatus in which air is added to the exhaust gas, and the resulting mixture is passed through a catalyst bed to catalytically oxidize noxious unburned or thermally degraded hydrocarbon vapors or other organic vapors and carbon monoxide to innocuous products such as carbon dioxide and water vapor. The term hydrocarbons will be understood to encompass and include residual unburned hydrocarbons, thermally degraded hydrocarbons and other organic vapors in the exhaust gas stream. The catalytic oxidation procedure, during steady state operation with a hot engine and hot exhaust gas, usually results in the substantial elimination of these deleterious components initially present in the exhaust gas from external or internal combustion engines such as jet engines, gas turbines, diesel engines or gasoline-burning automobile, bus and truck engines or the like, so as to prevent the discharge of these noxious components including unburned hydrocarbons, other organic vapors and carbon monoxide into the atmosphere, and thereby prevent air pollution.

Description of the prior art.—Numerous catalysts, catalytic devices and mufflers, and treatment systems have been proposed for the processing of exhaust gas emitted by engines, so as to control engine exhaust emissions and prevent the discharge of noxious components into the atmosphere. Among the many patents relating to catalysis and catalytic formulations may be mentioned U.S. Pats. Nos. 3,053,773; 3,429,656; 3,316,057; 3,398,101; 3,477,893 and 3,476,508 and U.S. patent applications Nos. 55,998 filed July 17, 1970 and 45,576 filed June 11, 1970 now U.S. Pat. No. 3,701,822. Apparatus for carrying out the procedure are described in U.S. Pats. Nos. 3,380,810; 3,325,256; 3,255,123; 3,222,140; 3,186,806; 3,180,712; 3,169,836; 3,168,806; 3,146,073; and 3,086,839 and U.S. patent applications Nos. 33,359 filed April 30, 1970 now U.S. Pat. No. 3,656,915 and 143,401 filed May 14, 1971, which describe two-stage apparatus for carrying out the process with interstage air injection.

SUMMARY OF THE INVENTION

In the present invention, the exhaust gas is passed into a catalytic device which is generally in the form of a cylindrical container, by passing the exhaust gas from the engine into a central coaxial perforated pipe which is uniformly tapered from the gas inlet end to a terminus of restricted dimension at the other end of the container. The tapering of the central pipe, which passes exhaust gas into the container which contains at least one catalyst bed, serves to compensate for high gas velocity and uniformly distributes the exhaust gas from the central perforated pipe into the catalyst bed.

It is an object of the present invention to provide an improved apparatus for the treatment of engine exhaust gas to prevent air pollution.

Another object is to uniformly distribute high velocity engine exhaust gas into a catalyst bed which is generally cylindrical, so that the exhaust gas flows uniformly and radially outwards through the catalyst bed from a central co-axial tapered gas distribution pipe.

A further object is to provide an improved apparatus for two-stage catalytic treatment of engine exhaust gas, in which catalytic reduction of nitrogen oxides takes place in the first stage and catalytic oxidation of hydrocarbons and carbon monoxide takes place in the second stage.

An additional object is to provide an apparatus for exhaust gas treatment by catalysis to eliminate noxious components, in which uniform distribution of exhaust gas into the catalyst bed is attained with low gas pressure drop.

These and other objects and advantages of the present invention will become evident from the description which follows.

DESCRIPTION OF THE DRAWINGS AND PREFERRED EMBODIMENTS

Figure 2:
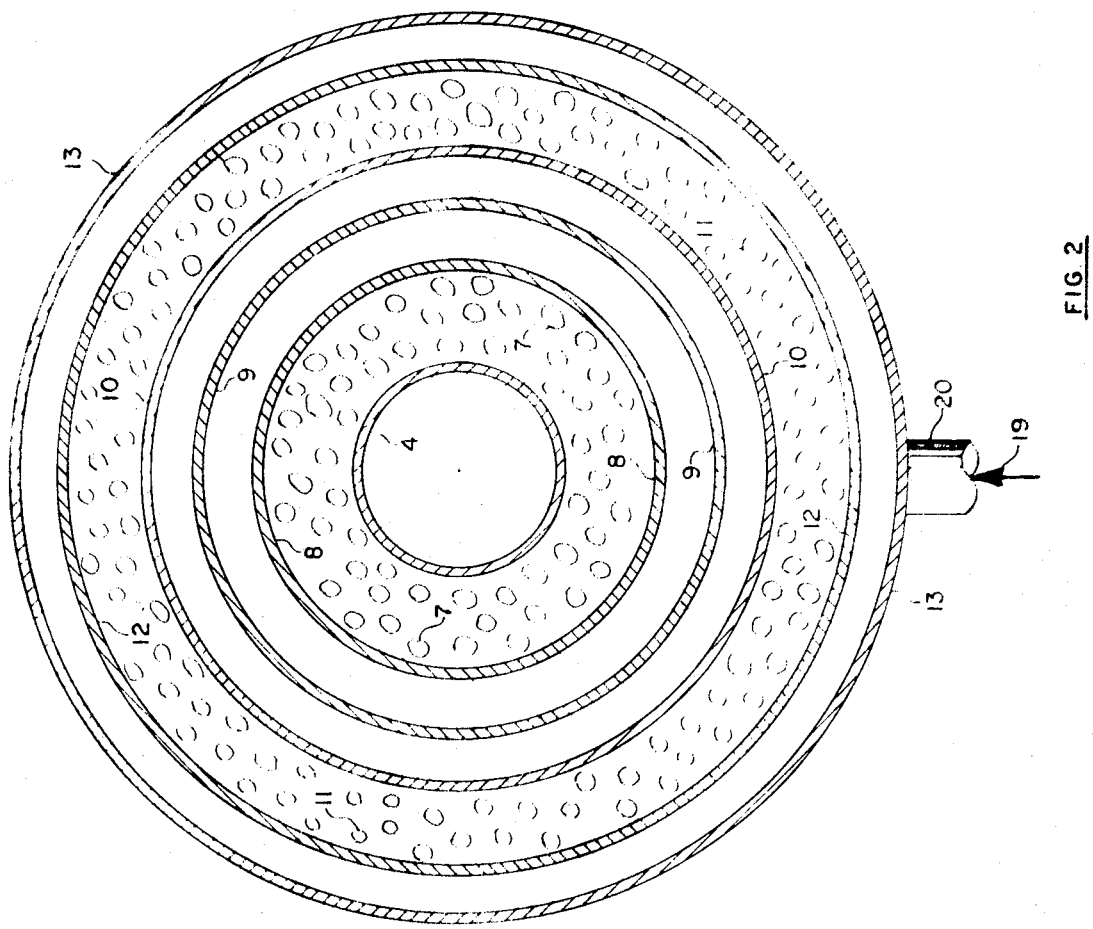
Figure 3:
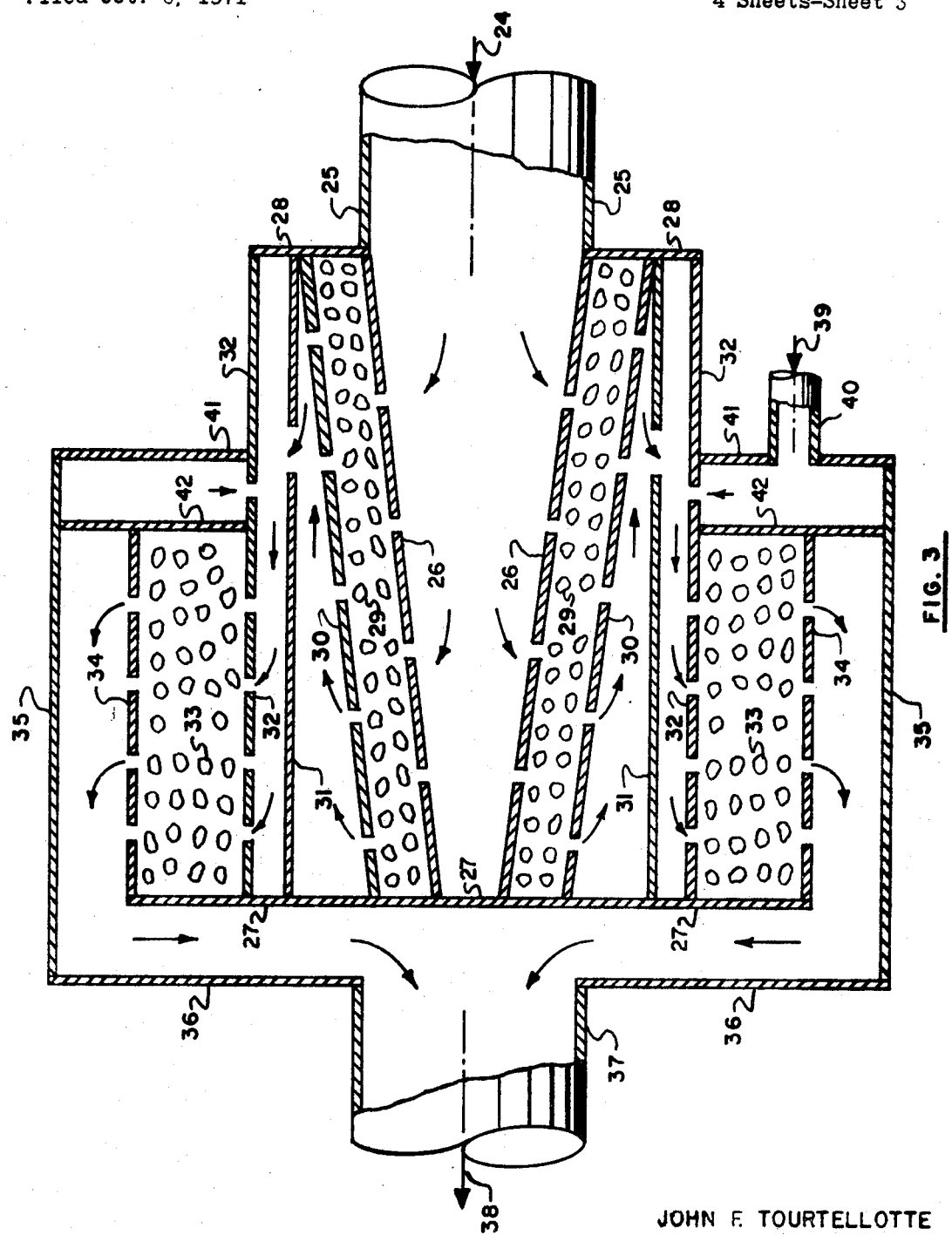

Referring now to the drawings,

FIG. 1 is a sectional elevation view of a preferred embodiment of the invention, FIG. 2 is a sectional view of FIG. 1, taken on section 2—2, FIG. 3 is a sectional elevation view of an alternative embodiment of the invention, FIGS. 4 and 5 are isometric views of two embodiments of species of central tapered pipes, showing two species of perforations.

Referring now to FIG. 1, engine 1 is typically an internal combustion engine mounted in an automobile or the like. A fuel stream typically consisting of a fluid hydrocarbon or hydrocarbon mixture such as gasoline is burned with combustion air in unit 1 to generate usable power and an engine exhaust gas stream 2. The gas stream 2 typically contains noxious components including nitrogen oxides, hydrocarbon vapors and carbon monoxide.

Stream 2 is passed from engine 1 via pipe 3 generally cylindrical configuration into the foraminous or perforated pipe 4, which is tapered in accordance with the present invention, from an inlet cross-sectional dimension comparable to that of pipe 3, to a much reduced cross-sectional area defined by the terminal circular or disc-shaped baffle 23. The exhaust gas stream passes at high velocity into the central pipe 4, and due to tapered nature of pipe 4 the exhaust gas is uniformly distributed radially outwards through the openings in pipe 4.

A flat ring-shaped baffle 5 extends outwards at the junction of pipes 3 and 4, and baffle 5 is preferably disposed substantially perpendicular to pipe 4. A flat ring-shaped baffle 6 extends outwards at the junction of pipe 4 and baffle 23, and baffle 6 is preferably disposed substantially perpendicular to pipe 4 and parallel to baffle 5. A first catalyst bed 7 is disposed in the annular spacing between pipe 4 and substantially cylindrical or frusto-conical baffle 8, which is perforated or foraminous and extends between baffles 5 and 6. Thus the catalyst bed 7 is substantially cylindrical.

The hot exhaust gas stream flows radially outwards from pipe 4 and through bed 7, and the nitrogen oxides content of the exhaust gas is selectively reduced to nitrogen in bed 7 by catalytic reaction with carbon monoxide and/or hydrocarbons and hydrogen contained in the exhaust gas. The reaction typically takes place at a temperature in the range of 300° C. to 600° C., and bed 7 consists of discrete particles of any suitable catalyst, catalytic agent or formulation for the reaction, such as the catalysts described in the patents enumerated supra. Preferred catalysts include the oxides, salts or reduced oxides of nickel, cobalt, copper and/or manganese, mixtures thereof, or the elemental metals, deposited on a suitable carrier such as alumina.

The catalytically treated gas, now substantially devoid of nitrogen oxides, passes radially outwards from bed 7 and through the plurality of openings in the foraminous cylindrical baffle 8, which is concentrically and coaxially disposed external to catalyst bed 7 and defines the outer periphery of bed 7, which is also defined by end baffles 5 and 6. The exhaust gas is diverted laterally external to baffle 8 by clindrical baffle 9, which is concentrically spaced about baffle 8 and extends between baffles 5 and 6. The exhaust gas next flows outwards through a circular row of openings in baffle 9 and then flows laterally towards baffle 6 between concentric baffles 9 and 10. Secondary air is injected into this laterally flowing exhaust gas, and mixes with the exhaust gas to provide an excess of free oxygen in the exhaust gas. The air-exhaust gas mixture flowing laterally between baffle 9 and the baffle 10 next flows outwards through the plurality of openings in the perforated substantially cylindrical baffle 10, and radially outwards through the outer cylindrical catalyst bed 11.

The catalyst bed 11 is provided with a plurality of discrete particles of an active catalytic agent for the selective oxidation of hydrocarbons and carbon monoxide to water vapor and carbon dioxide. In most instances, the same catalytic agent, known as a redox catalyst because of ability to catalyze both reducing and oxidizing reactions, will be provided in both beds 7 and 11. The resulting reaction in bed 11 serves to oxidize and eliminate hydrocarbons and carbon monoxide from the gas stream. The fully treated exhaust gas discharged radially outwards from bed 11 flows through the plurality of openings in the outer concentric substantially cylindrical baffle 12, laterally between baffle 12 and the substantially cylindrical container wall 13, inwards between baffle 6 and the circular container end wall 14, and through central outlet pipe 15 for discharge from the device via stream 16.

Secondary air is injected into the exhaust gas by passing ambient or preheated air stream 17 into pump or blower 18, which discharges air stream 19 via pipe 20 into the annular distributing passage defined between ring-shaped baffles 21 and 22. The air next flows from between baffles 21 and 22 through the openings or slit in baffle 10 for mixture with the exhaust gas.

FIG. 2 is a sectional elevation view of FIG. 1, taken on section 2—2, and shows the concentric circular orientation about a central axis of central pipe 4, bed 7, baffles 8, 9 and 10, bed 11 and baffles 12 and 13.

FIG. 3 shows an alternative embodiment of the invention which may be adopted in some instances, especially in instances when ease of fabrication is an important practical consideration. The exhaust gas stream 24 flows via inlet pipe 25 into the tapered foraminous central feed pipe 26, which is provided with a tapered configuration and a generally uniformly decreasing or diminishing cross-section dimension along its length from a gas inlet adjacent to pipe 25 to a terminus at the disc-shaped closure baffle 27, in accordance with the present invention. An opposite ring-shaped closure baffle 28 extends outwards from the junction of pipes 25 and 26, and baffle 28 is perpendicular to pipe 25. The high velocity exhaust gas flowing into pipe 26 is thus uniformly distributed through the openings in pipe 26 and into catalyst bed 29, which is similar in configuration and function to bed 7 described supra. Catalytic reduction of nitrogen oxides takes place in bed 29, and the exhaust gas next flows through tapered foraminous baffle 30, which is essentially frusto-conical and concentrically spaced about pipe 26. The exhaust gas flows laterally between baffle 30 and cylindrical baffle 31, and outwards through a circular row of openings in baffle 31. The gas next flows laterally between baffle 31 and foraminous cylindrical baffle 32, and secondary air is injected into the exhaust gas. The air-exhaust gas mixture flows outwards through openings in baffle 32 and into the cylindrically oriented catalyst bed 33 in which oxidative elimination of hydrocarbons and carbon monoxide takes place. The exhaust gas flows outwards from bed 33 and through the openings in the perforated or foraminous cylindrical baffle 34, laterally between baffle 34 and cylindrical container wall 35, inwards between baffle 27 and end wall 36 of the container, and finally out of the container via pipe 37 as stream 38. Secondary air stream 39 flows via pipe 40 into the annular distribution channel or passage defined between ring-shaped baffles 41 and 42, with the secondary air next flowing inwards through the circular row of openings or slit provided in baffle 32.

FIG. 4 shows a typical configuration of the tapered central gas distributing pipe 4 or 26, in which the perforations are circular. FIG. 5 shows an alternative embodiment of pipe 4 or 26 in which the perforations are in the form of elongated slits.

Numerous alternatives within the scope of the present invention will occur to those skilled in the art. The various baffles 8, 9, 10, 12 and 13 of FIG. 1 and 30 of FIG. 2 may in practice be provided with only a slight taper and may be substantially cylindrical, or in the other instances these baffles may be distinctly frusto-conical. The term substantially cylindrical will be understood to encompass both of these configurations. The perforations in pipe 4 and in baffles 8, 10, 12 of FIG. 1 and in pipe 26 and in baffles 30, 32 and 34 of FIG. 2 may be of any suitable configuration and orientation in practice, besides those preferred configurations shown in FIGS. 4 and 5. The central axis of the device is preferably horizontal or inclined from the horizontal, however the device may also be operated in a vertical position or orientation. Appropriate spacers or the like may be provided between adjacent baffles in practice.

We claim:

1. An apparatus for catalytically treating the exhaust gas derived from an engine and containing nitrogen oxides, hydrocarbons and carbon monoxide which comprises a cylindrical container, a first pipe, said first pipe extending from an engine exhaust gas source to one end of said container and being coaxial with said container, whereby exhaust gas is passed through said first pipe to said container, a second pipe, said second pipe extending coaxially through said container from the outlet end of said first pipe, said second pipe being perforated and tapered to a decreased terminal cross-section within said container, a first substantially cylindrical baffle, said first baffle being perforated and coaxial with said second pipe and concentrically disposed external to and spaced from said second pipe within said container, a first annular catalyst bed, said first bed being disposed between said second pipe and said first baffle, said first bed containing discrete solid particles of a catalyst for the reduction of nitrogen oxides in said exhaust gas, whereby exhaust gas flowing from said first pipe into said second pipe and outwards through the perforations in said second pipe is catalytically reacted in said first bed and nitrogen oxides are reduced, means to inject into the exhaust gas discharged outwards through the perforations in said first baffle, a second substantially cylindrical baffle, said second baffle being perforated and coaxial with said second pipe and concentrically disposed external to and spaced from said first baffle within said container, a third substantially cylindrical baffle, said third baffle being perforated and coaxial with said second pipe and concentrically disposed external to and spaced from said second baffle within said container, a second annular catalyst bed, said second bed being disposed between said second baffle and said third baffle, said second bed containing discrete solid particles of a catalyst for the oxidation of carbon monoxide and hydrocabons in said exhaust gas, whereby the exhaust gas-air mixture formed external to said first baffle flows through the perforations in said second baffle and outwards through said second bed and is catalytically reacted in said second bed, and carbon monoxide and hydrocarbons are oxidized, and means to remove the catalytically treated exhaust gas from said container.

2. The apparatus of claim 1, in which said peforations in said second pipe and said first, second and third baffles are circular.

3. The apparatus of claim 1, in which said perforations in said second pipe and said first, second and third baffles are parallel elongated slits.

4. The apparatus of claim 1, in which said first, second and third baffles are truncated conical baffles.

References Cited

UNITED STATES PATENTS

| | | | |
|---|---|---|---|
| 3,154,388 | 10/1964 | Purse | 23—288 F |
| 3,166,382 | 1/1965 | Purse et al. | 23—288 F |
| 3,174,836 | 3/1965 | Gary | 23—288 F |
| 3,180,712 | 4/1965 | Hamblin | 23—288 F |
| 3,222,140 | 12/1965 | Scivally et al. | 23—288 F |
| 3,228,746 | 1/1966 | Howk et al. | 423—213 |
| 3,380,810 | 4/1968 | Hamblin | 23—288 F |
| 3,544,264 | 12/1970 | Hardison | 23—288 F X |

BARRY S. RICHMAN, Primary Examiner

U.S. Cl. X.R.

60—301; 423—213